US006822776B2

(12) United States Patent
Hah et al.

(10) Patent No.: US 6,822,776 B2
(45) Date of Patent: Nov. 23, 2004

(54) SCANNING MICROMIRROR FOR OPTICAL COMMUNICATION SYSTEMS AND METHOD OF MANUFACTURING THE SAME

(75) Inventors: Doo-Young Hah, Seoul (KR); Ho-Jun Ryu, Daejeon (KR); Chang-Auck Choi, Daejeon (KR); Chi-Hoon Jun, Daejeon (KR); Youn Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/308,137

(22) Filed: Dec. 3, 2002

(65) Prior Publication Data

US 2004/0032634 A1 Feb. 19, 2004

(30) Foreign Application Priority Data

Aug. 13, 2002 (KR) ........................................ 2002-47763

(51) Int. Cl.[7] ............................................... G02B 26/08
(52) U.S. Cl. ..................... 359/224; 359/223; 359/198; 359/199; 359/900
(58) Field of Search ............................... 359/223, 224, 359/198–199, 900; 310/309; 73/504.12, 504.14, 504.16

(56) References Cited

U.S. PATENT DOCUMENTS

| 5,914,801 | A | 6/1999 | Dhuler et al. |
| 6,000,280 | A | 12/1999 | Miller et al. |
| 6,593,677 | B2 * | 7/2003 | Behin et al. ................. 310/309 |

OTHER PUBLICATIONS

Harald Schenk, et al.; *Large Deflection Micromechanical Scanning Mirrors for Linear Scans and Pattern Generation*; IEEE Journal of Selected Topics in Quantum Electronics, vol. 6, No. 5, Sep./Oct., 2000; pp. 715–722.

Osamu Tsuboi, et al.; A Rotational Comb–Driven Micromirror with A Large Deflection Angle and Low Drive Voltage; 0–7803–7185–2/02; 2002 IEEE; pp. 532–535.

* cited by examiner

*Primary Examiner*—James Phan
(74) *Attorney, Agent, or Firm*—Jacobson Holman PLLC

(57) ABSTRACT

The present invention relates to a scanning micromirror for optical communications. The scanning micromirror comprises an outer frame having an aperture therein, an inner frame located within the aperture of the outer frame and having an aperture therein, an optical reflecting means located within the aperture of the inner frame, a plurality of first torsion springs connected between an inner wall of the outer frame and an outer wall of the inner frame, for supporting the inner frame, a plurality of second torsion springs connected between the inner wall of the inner frame and the optical reflecting means, for supporting the optical reflecting means, first comb-type electrostatic actuators for applying electrostatic torque by which the inner frame is rotated about an axis of the first torsion springs, and second comb-type electrostatic actuators for applying electrostatic torque by which the optical reflecting means is rotated about an axis of the second torsion springs. Therefore, as the present invention uses vertical comb-type electrostatic actuators, an available rotation angle can be made large compared to a conventional case using a parallel-plate type electrostatic actuator. As the vertical asymmetry of the fixed combs and the movable combs are large, a large rotation angle can be obtained in non-resonant mode as well as resonant mode.

11 Claims, 12 Drawing Sheets

SCANNING MICROMIRROR FOR OPTICAL COMMUNICATION SYSTEMS AND METHOD OF MANUFACTURING THE SAME

BACKGROUND OF THE INVENTION

1. Field of the Invention

The invention relates generally to a scanning micromirror used in optical communication systems, and more particularly to, a 2-axis tilt scanning micromirror having vertical comb-drive actuators, and method of manufacturing the same.

2. Description of the Prior Art

Micro-electro-mechanical system (MEMS) is a technology of miniaturization and integration of mechanical and electronic devices. With this technology one can precisely manufacture very small electro-mechanical devices on a semiconductor wafer using processes such as lithography, deposition, etching, or the like and integrate multi-functional devices on one chip.

Recently, in the optical communication systems, there is explosive demand on bandwidth due to network traffic increase. MEMS can be a key enabling technology in this optical network. It is expected that current optical cross-connect (OXC) system including optical-electronic-optical (O-E-O) conversion will confront a bottleneck phenomenon due to rapid increase of the data transmission rate. MEMS technology is thought to be effectively used to overcome this obstacle and move oil to an all-optical system without necessity of O-E-O conversion by providing an array of scanning micromirrors.

OXC using MEMS technology can be classified into 2-D and 3-D type depending on the system configuration. 2-D OXC employs digitally-controlled optical matrix switches and 3-D OXC employs an analog scanning micromirror array. As 2-D OXC is driven digitally it has advantages of easy control, high reliability, and relatively easy optical alignment. However, in case of a N×N OXC, it requires $N^2$ micromirrors and its optical insertion loss is significantly increased as the number of the input/output port is increased. Therefore, experts in the art expect that the maximum number of the port will be limited to 32×32.

On the other hand, 3-D OXC requires additional complicated control scheme such as closed-loop feedback control, etc., since it uses analog micromirrors and optical alignment in this case is very difficult. However, it only requires 2N micromirrors in case of N×N OXC. Further, it is very advantageous in terms of insertion loss when that the number of the input/output port is over 32 owing to its high scalability.

In 3-D OXC, the scanning micromirror is rotated by actuators so that an optical signal is routed from a single input optical fiber to a single output optical fiber. In other words, it serves to change a path of the optical signal. Generally, the scanning micromirror employs electrostatic, electromagnetic, piezoelectric, thermal actuation mechanism, and the like. Among them, electrostatic actuation has low power consumption, relatively high speed and matured fabrication technology. It is thus considered as the most suitable actuation mechanism for 3-D OXC. In addition, this scanning micromirror is used for an optical add-drop multiplexer (OADM), a wavelength selective cross-connect (WSXC), or the like, in the optical network, as well as a high-resolution display, an optical scanner, or the like.

Currently, the scanning micromirror with the electrostatic actuators for 3-D OXC employs a parallel-plate type actuator of which design is relatively easy. For example, U.S. Pat. No. 5,914,801 (hereinafter called 'reference document 1') entitled "Microelectro-mechanical Devices Including Rotating Plates and Related Methods" by 'V, R. Dhuler, et al.' (Jul. 22, 1999) discloses a microelectromechanical device, which is driven by the parallel-plate type electrostatic actuator and is rotated about two axes. The reference document 1 discloses a technical idea that the scanning micromirror includes a first frame, a second frame and a plate, each of which is connected through beams, and the plate is rotated about two axes by the parallel-plate type electrostatic actuator to change the optical path.

The scanning micromirror employing the parallel-plate type electrostatic actuators, however, has disadvantages that whole range of rotation angle cannot be used due to a pull-in phenomenon, and the response speed is low due to squeezed air damping.

SUMMARY OF THE INVENTION

The present invention is contrived to solve the above problems and an object of the present invention is to provide a scanning micromirror for optical communication having a large rotation angle and rapid response speed due to low air damping.

Another object of the present invention is to provide a method of manufacturing a scanning micromirror for optical communications having a large rotation angle and rapid response speed due to low air damping.

In order to accomplish the above object, the scanning micromirror for optical communications according to the present invention, is characterized in that it comprises an outer frame having an aperture therein, an inner frame located within the aperture of the outer frame and having an aperture therein, an optical reflecting means located within the aperture of the inner frame, a plurality of first torsion springs connected between an inner wall of the outer frame and an outer wall of the inner frame, for supporting the inner frame, a plurality of second torsion springs connected between the inner wall of the inner frame and the optical reflecting means, for supporting the optical reflecting means, a pair of first comb-type electrostatic actuators electrically isolated from each other for applying electrostatic torques by which the inner frame is rotated bi-directionally about an axis of the first torsion springs, and a pair of second comb-type electrostatic actuators electrically isolated from each other for applying electrostatic torques by which the optical reflecting means is rotated bi-directionally about an axis of the second torsion springs.

At this time, it is preferred that the first comb-type electrostatic actuators include first fixed combs of which one ends are connected to the inner wall of the outer frame and the other ends are free, and first movable combs of which one ends are connected to the outer wall of the inner frame and the other ends are free, wherein the first movable combs are interdigitated with the first fixed combs.

Also, it is preferred that the second comb-type electrostatic actuators include second fixed combs of which one ends are connected to the inner wall of the inner frame and the other ends are free, and second movable combs of which one ends are connected to the optical reflecting means and the other ends are free, wherein the second movable combs are interdigitated with the second fixed combs.

In order to accomplish another object, the method of manufacturing the scanning micromirror for optical communications according to the present invention, is characterized in that it comprises the steps of (a) forming a first upper silicon dioxide layer and a lower silicon dioxide layer on both sides of a silicon-on-insulator (SOI) wafer comprising a handling silicon layer, a buried silicon dioxide layer and a silicon device layer, (b) depositing a polysilicon layer on the first upper silicon dioxide layer and then patterning the polysilicon layer using a mask for defining a portion of the first fixed combs, the second fixed combs, the first torsion springs, the outer frame and the inner frame, to which the second fixed combs are connected, (c) depositing a second upper silicon dioxide layer on the entire structure and then patterning the: second upper silicon dioxide layer and the first upper silicon dioxide layer using a mask that defines a portion of the remaining polysilicon layer, the first movable combs, the second movable combs, the optical reflecting means, the second torsion springs and the inner frame, to which the first movable combs are connected, (d) patterning the lower silicon dioxide layer using a mask that defines a portion in which the handling layer is thinned down to have a given thickness, (e) etching the silicon device layer using the first upper silicon dioxide layer as a mask, (f) removing the second upper silicon dioxide layer, etching the first upper silicon dioxide layer using the polysilicon layer as a mask and etching the buried silicon dioxide layer using the silicon device layer as a mask, (g) etching the handling silicon layer so that it has a given thickness, using the lower silicon dioxide layer as a mask, (h) removing the polysilicon layer, etching the silicon device layer using the first upper silicon dioxide layer remaining below the polysilicon layer as a mask and then etching the handling silicon layer using the buried silicon dioxide layer as a mask, and (i) removing the first upper silicon dioxide layer and the lower silicon dioxide layer, removing the buried silicon dioxide layer using the remaining silicon device layer as a mask and then depositing a metal layer on upper surface and lower surface of the entire structure.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1A:
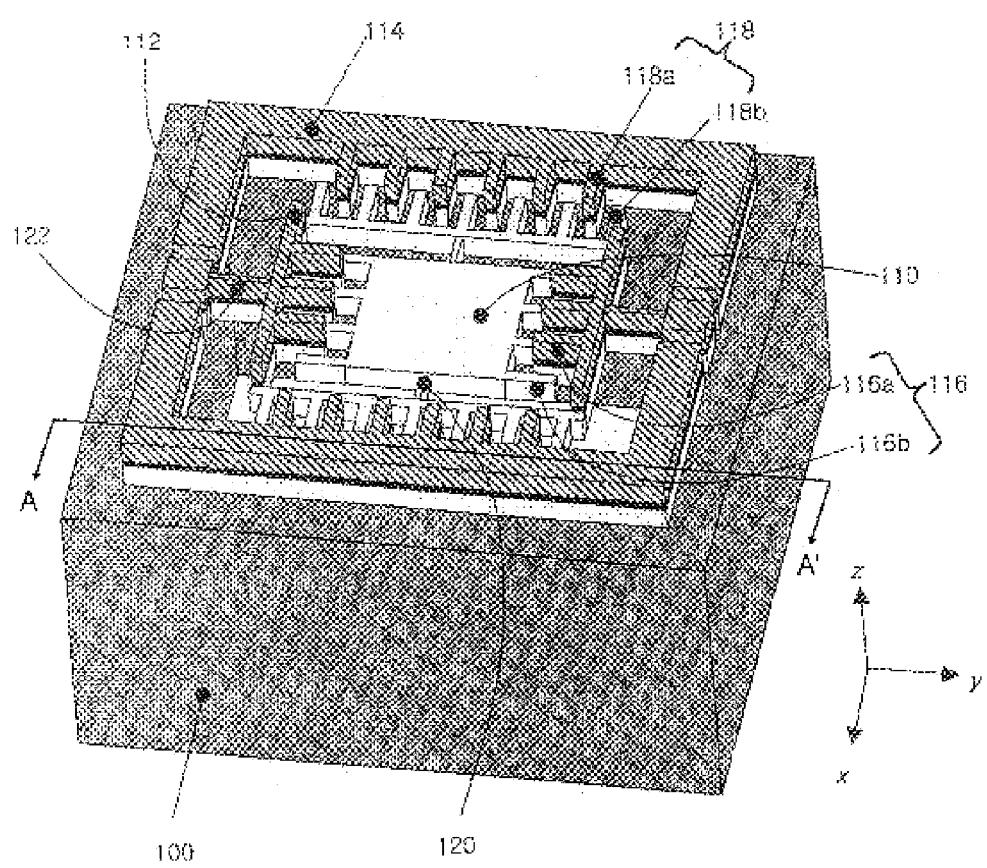
FIG. 1a is a perspective view of a scanning micromirror according to a preferred embodiment of the present invention.

The present invention will be described in detail by way of a preferred embodiment with reference to accompanying drawings, in which like reference numerals are used to identify the same or similar parts.

Figure 1B:
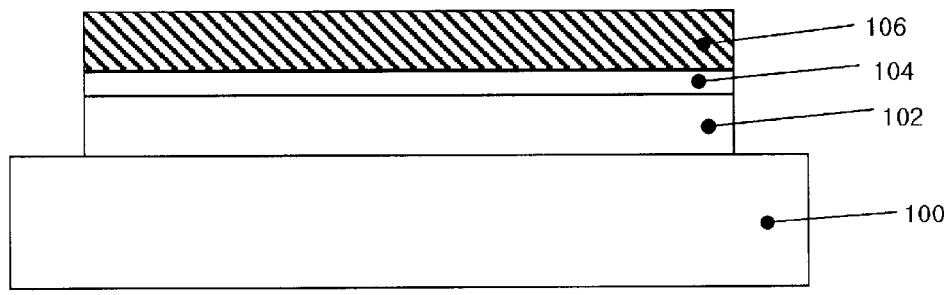
FIG. 1b is a cross-sectional view of the scanning micromirror shown in FIG. 1 a taken along line AA'.
Figure 2D:
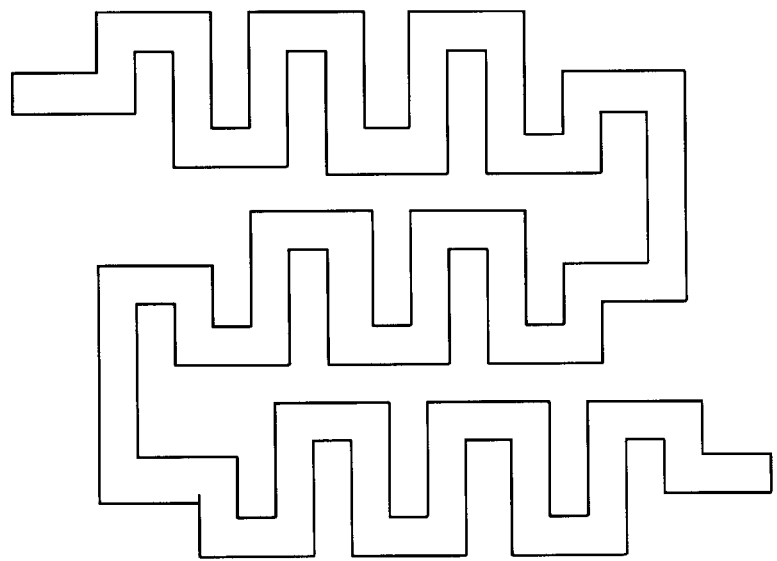
FIG. 2(a)~FIG. 2(d) are plane views of the first torsion springs and the second torsion springs in FIG. 1a for explaining embodiments of them.
Figure 2C:
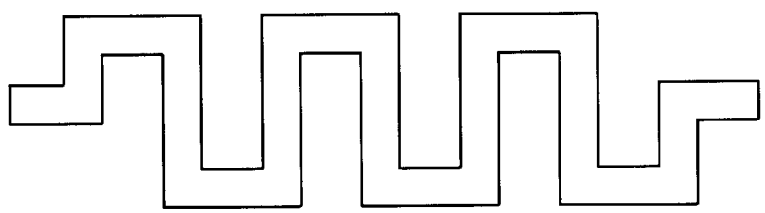
Figure 2B:
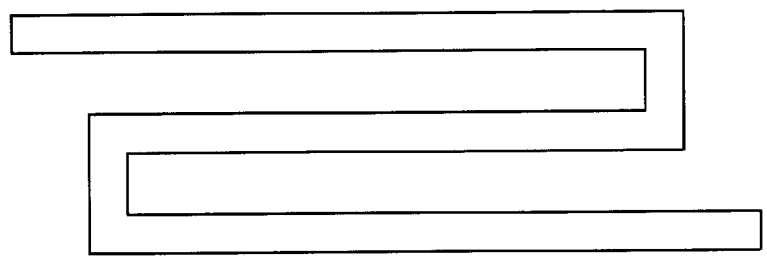
Figure 2A:
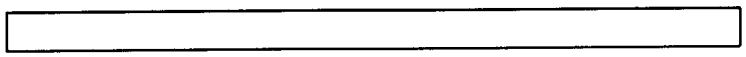

FIG. 1a is a perspective view of a scanning micromirror according to a preferred embodiment of the present invention and FIG. 1b is a cross-sectional view of the scanning micromirror shown in FIG. 1a taken along line AA'.

Referring now to FIG. 1b, the scanning micromirror includes a substrate 100, a lower layer 102, an intermediate layer 104 and an upper layer 106. At this time, it is preferred that the lower layer 102 and the upper layer 106 are made of a conductive material and the intermediate layer 104 is made of an insulating material. The lower layer 102 is electrically isolated from the upper layer 106 with the intermediate layer 104 intervened between them. Respective portions of the upper layer 106 are electrically and physically isolated. The intermediate layer 104 electrically isolates but physically connects the upper layer 106 and the lower layer 102. At this time, it is preferred that the thickness of the upper layer and the lower layer is 1 $\mu$m~500 $\mu$m and the thickness of the intermediate layer is 0.5 $\mu$m~10 $\mu$m.

By reference to FIG. 1a, the scanning micromirror according to the preferred embodiment of the present invention includes the substrate 100, an optical reflecting means 110, an inner frame 112, an outer frame 114, second comb-type electrostatic actuators 116, first comb-type electrostatic actuators 118, second torsion springs 120 and first torsion springs 122. The scanning micromirror serves to change the path of a reflected optical signal as the optical reflecting means 110 is rotated about axes of the second torsion springs 120 and the first torsion springs 122 by means of the electrostatic actuators.

The outer frame 114 includes an upper layer, an intermediate layer and a lower layer on the substrate. At this time, it is preferred that the outer frame 114 has a rectangular loop shape having an aperture therein. Further, portions of the outer frame 114, to which the first torsion springs 122 are connected, are cut. The reason why the portions are cut is that the upper layer portions of first fixed combs 118a in the first comb-type electrostatic actuators 118 that are positioned around the first torsion springs 122 are electrically isolated. Further, this is for the purpose of electrically isolating the upper layer portions of the first fixed combs 118a in the first comb-type electrostatic actuators and the upper layer portions of the second fixed combs 116a in the second comb-type electrostatic actuators. In other words, the upper layer portions of all the fixed combs 116a and 118a are cut and electrically isolated. The lower layer portions of all the movable combs 116b and 118b and the fixed combs 116a and 116b are connected to have the same potential. The inner frame 112 is located within the aperture of the outer frame 114. The portions of the inner frame to which the first movable combs 118b are connected have only the lower layer. Also, the portions of the inner frame to which the first torsion springs 122 are connected have the upper layer, the intermediate layer and the lower layer. It is also preferred that the inner frame 112 has a rectangular loop shape having an aperture therein. The optical reflecting means 110 is located within the aperture of the inner frame 112. The optical reflecting means 110 has only the lower layer. It should be noted that the plane of the optical reflecting means 110 may be rectangular, hexagonal, octagonal, circular or oval.

The first comb-type electrostatic actuators 118 and the second comb-type electrostatic actuators 116 include the fixed combs 116a and 118a consisting of the upper layer, the intermediate layer and the lower layer, and the movable combs 116b and 118b consisting of only the lower layer. The second comb-type electrostatic actuators and the first comb-type electrostatic actuators constructed above may be in plural, preferably by every two. One end of the first fixed comb 118a is connected to inner wall of the outer frame 113 and the other end of it is free. Also, one end of the first movable comb 118b is connected to outer wall of the inner frame 112 and the other end of it is free. Further, one end of the second fixed comb 116a is connected to inner wall of the inner frame 112 and the other end of it is free. In addition, one end of the second movable comb 116b is connected to the optical reflecting means and the other end of it is free. If a voltage is applied between the upper layer of the fixed combs 116a and 118a and the movable combs 116b and 118b, the movable combs 116b and 118b are rotated about axes of the second torsion springs 120 and the first torsion springs 122 by means of an electrostatic torque. At this time, the fixed combs 116a and 118a and the movable combs 116b and 118b are interdigitated but are not electrically or physically connected. As the second comb-type electrostatic actuators 116 and the first comb-type electrostatic actuators 118 are arranged in perpendicular each other, the optical reflecting means 110 is rotated around the x-axis by means of the second comb-type electrostatic actuators 116. The inner frame 112 to which the optical reflecting means 110 is connected is rotated about the y-axis by means of the first comb-type electrostatic actuators 118.

For this, it is required that the first torsion springs 122 and the second torsion springs 120 be positioned perpendicularly to each other. Thereby, the optical reflecting means 110 can independently rotate about the x-axis or the y-axis. The first torsion springs 122 include the upper layer, the intermediate layer and the lower layer and bridge the outer frame 114 and the inner frame 112. Further, the first torsion springs 122 provide not only restoring torque but also electrical connection from the outer frame 114 to the second comb-type electrostatic actuators 116 and the movable combs 118b of the first comb-type electrostatic actuators. The second torsion springs 120 include only the lower layer. The second torsion springs 120 bridge the inner frame 112 that consists of only the lower layer and the optical reflecting means 110. Those second torsion springs and first torsion springs may be in plural, preferably by every two. However, it should be noted that the number of the second and first torsion springs may be four, six, etc., depending on a particular embodiment. If the second and first torsion springs are to be constructed in four, six, etc., it is required that the torsion springs located at one side be closely located. As shown in FIG. 2(a)~FIG. 2(d), the first torsion springs 122 and the second torsion springs 120 may have a straight type, a longitudinal meander type, a transversal meander type or a mixed type of the longitudinal meander type and the transversal meander type.

An operation of the scanning micromirror according to the preferred embodiment of the present invention will be now described.

Figure 3A:
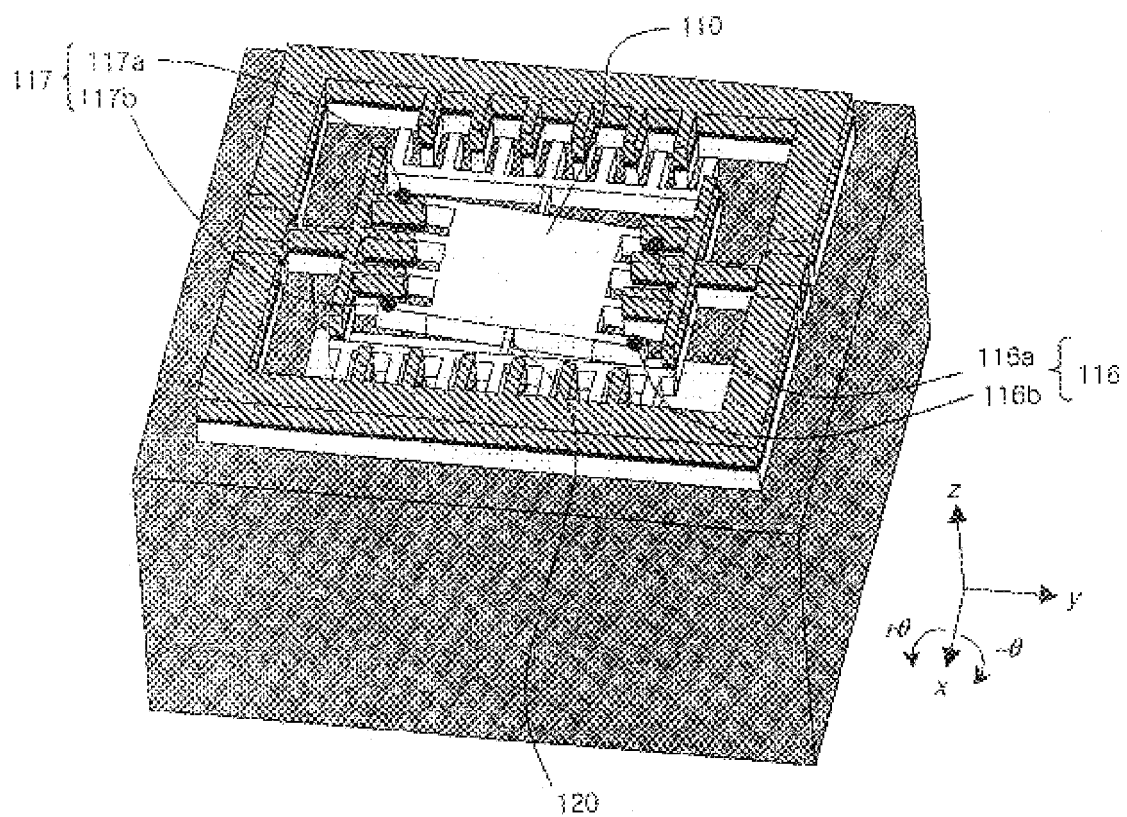
FIG. 3a~FIG. 3c are perspective views of the scanning micromirrors for explaining an operation of the scanning micromirror according to a preferred embodiment of the present invention.
Figure 3B:
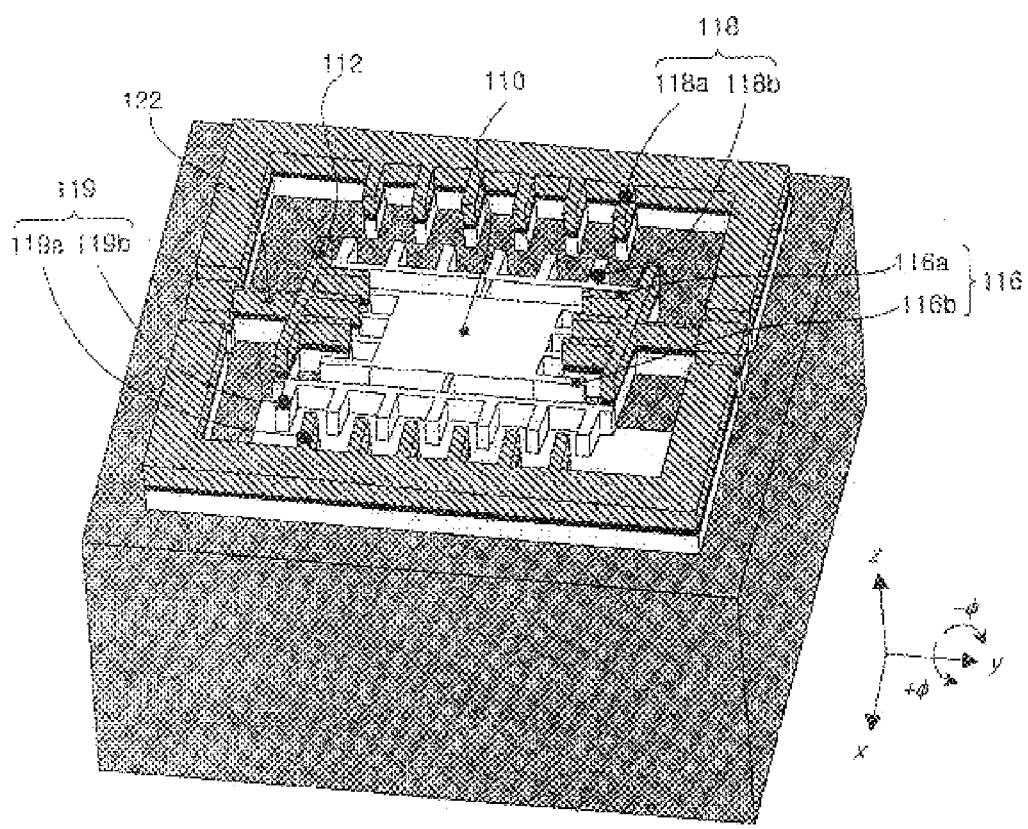
Figure 3C:
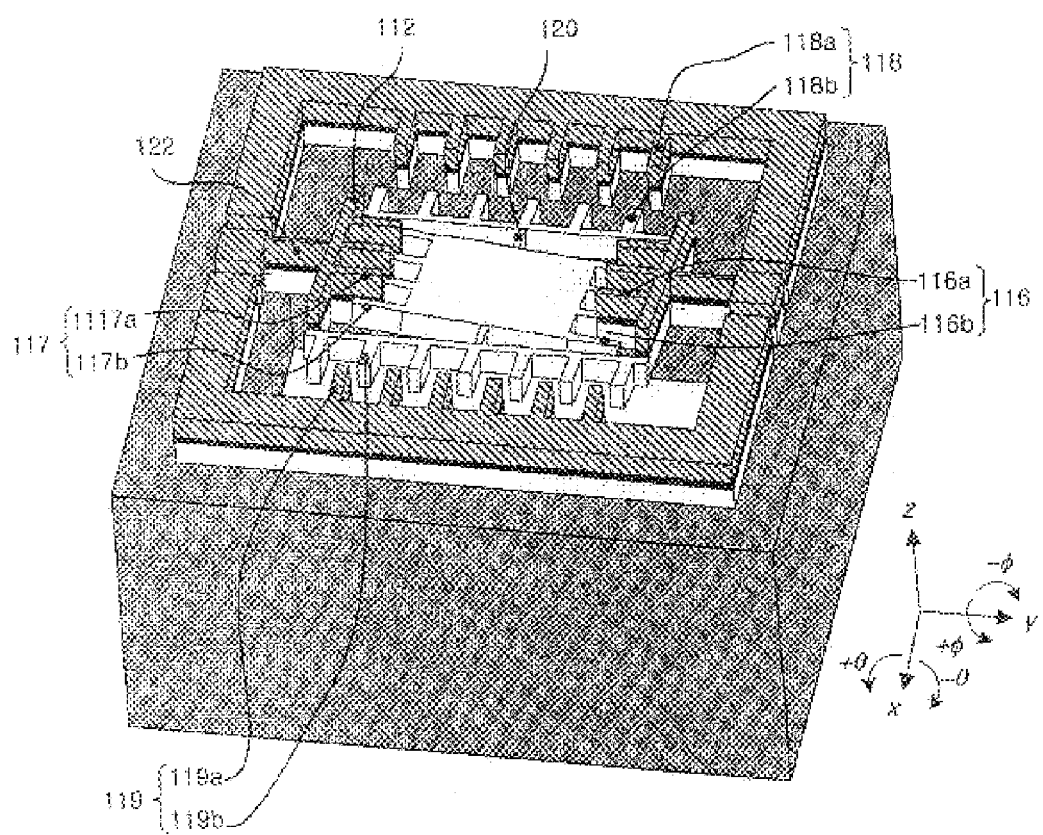

FIG. 3a~FIG. 3c are perspective views of the scanning micromirrors for explaining the operation of the scanning micromirror according to the preferred embodiment of the present invention.

FIG. 3a illustrates that when a voltage is applied to the second comb-type electrostatic actuators 116 and 117, the optical reflecting means 110 is rotated about the second torsion springs 120 in the x axis by means of the electrostatic torque. If the voltage is applied to the second comb-type electrostatic actuators 116 at one side, the optical reflecting means 110 is rotated in +θ direction. On the other hand, if the voltage is applied to the second comb-type electrostatic actuators 117 at the other side, the optical reflecting means 110 is rotated in −θ direction. A method of applying the voltage to the second comb-type electrostatic actuators 116 and 117 includes grounding the second movable combs 116b and 117b and the lower layers of the second fixed combs 116a and 117a and then applying a non-zero voltage to any one of the upper layers in the second fixed combs 116a and 117a.

FIG. 3b illustrates that when a voltage is applied to the first comb-type electrostatic actuators 118 and 119, the inner frame 112 to which the optical reflecting means 110 is connected is rotated about the first torsion springs 122 in the y-axis by means of the electrostatic torque. At this time, as the second comb-type electrostatic actuators 116 connected to the inner frame 112 is also rotated, the fixed comb 116a and the movable comb 116b in the second comb-type electrostatic actuators do not contact each other and the optical reflecting means 110 is accordingly rotated. If the voltage is applied to the first comb-type electrostatic actuators 118 at one side, the inner frame 112 is rotated in the +Φ direction. If the voltage is applied to the first comb-type electrostatic actuators 119 at the other side, the inner frame 112 is rotated in the −Φ direction. A method of applying the voltage to the first comb-type electrostatic actuators 118 and 119 includes grounding the first movable combs 118b and 119b and the lower layers of the first fixed combs 118a and 119a and then applying a non-zero voltage to any one of the upper layers in the first fixed combs 118a and 119a.

FIG. 3c illustrates that when a voltage is applied to the second comb-type electrostatic actuators 116 and 117 and the first comb-type electrostatic actuators 118 and 119, the inner frame 112 is rotated about the first torsion springs 122 and the optical reflecting means 110 is rotated about the second torsion springs 120, by means of the electrostatic torque, so that the optical reflecting means 110 is rotated in both directions, θ and Φ. More particularly, FIG. 3c shows that the inner frame 112 is rotated in the −Φ direction about the first torsion springs 122 and the optical reflecting means 110 is rotated in the −θ direction about the second torsion springs 112, by means of the electrostatic torque, by applying the voltage to the second comb-type electrostatic actuators 117 and the first comb-type electrostatic actuators 119.

A method of manufacturing the scanning micromirror according to the preferred embodiment of the present invention will be below described.

FIG. 4a~FIG. 4h are cross-sectional views of the scanning micromirrors for explaining the method of manufacturing the scanning micromirror according to the preferred embodiment of the present invention.

Figure 4A:
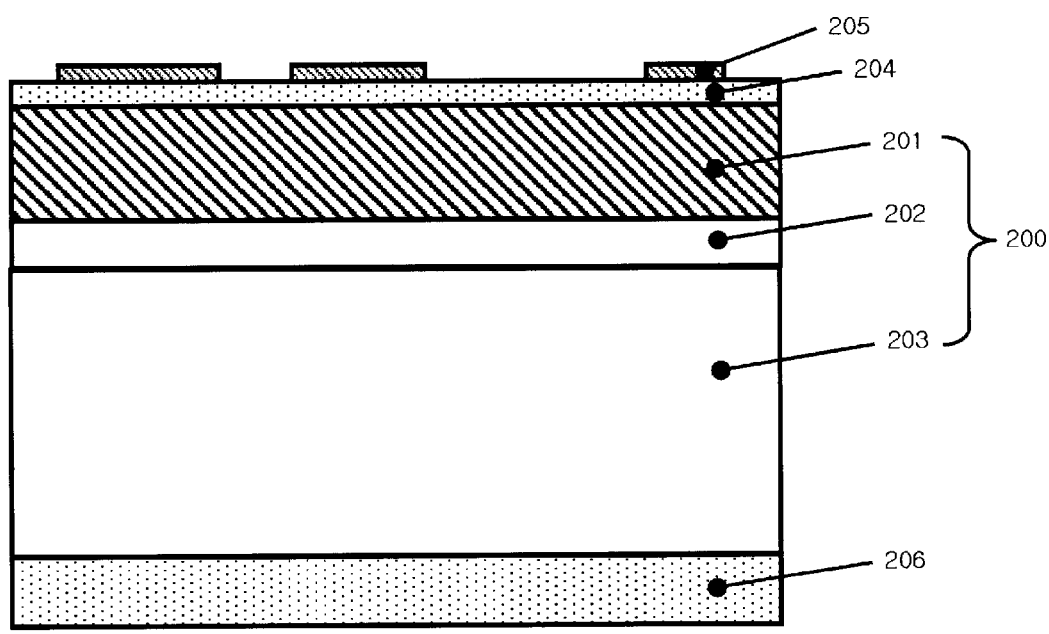
FIG. 4a~FIG. 4h are cross-sectional views of the scanning micromirrors for explaining a method of manufacturing the scanning micromirror according to a preferred embodiment of the present invention.

FIG. 4a is the cross-sectional view of the scanning micromirror illustrating a state that a first upper silicon dioxide layer 204 and a lower silicon dioxide layer 206 are deposited on upper surface and lower surface of a silicon-on-insulator (SOI) wafer 200, respectively, a polysilicon layer 205 is deposited on the first upper silicon dioxide layer 204 and the polysilicon layer 205 is then patterned. At this time, SOI wafer 200 comprises a handling layer. 203, a burned silicon dioxide 202 and a silicon device layer 201. The pattern of the polysilicon layer 205 is for discriminating a portion on which all of the upper layer, the intermediate layer and the lower layer remain and a portion where only the lower layer remains, in FIG. 4g that will be described later. The upper layer is not etched by the portion from which the polysilicon layer 205 is not etched, when silicon is etched in FIG. 4g. In other words, the polysilicon layer 205, serves as a mask that defines the second fixed combs 116a, the first fixed combs 118a, the first torsion springs 122, the outer frame 114 and a portion of the inner, frame 112 to which the second fixed combs are connected. The first upper silicon dioxide layer 204 deposited on the silicon device layer 201 is for forming a mask layer when a silicon device layer in FIG. 4d and FIG. 4g that will be described later is etched. The lower silicon dioxide layer 206 deposited on the lower surface of the handling silicon layer 203 is for forming a mask layer when the handling silicon layer in FIG. 4f that will be explained later is etched.

The thickness of the upper layer 106 in the scanning micromirror according to the preferred embodiment of the present invention is decided to be same as that of the silicon device layer 201. The thickness of the intermediate layer 104 is also decided to be same as that of the buried silicon dioxide layer 202. The total thickness in which the thickness of the lower layer 102 is added to the thickness of the substrate 100 is decided to be same as that of the handling silicon layer 203. At this time, it is preferred that the thickness of the handling silicon layer 203 is 100 $\mu$m~1000 $\mu$m, the thickness of the burned silicon dioxide layer 202 is 0.5 $\mu$m~10 $\mu$m and the thickness of the silicon device layer 201 is 1 $\mu$m~500 $\mu$m. SOI wafer may comprise five layers of an upper silicon device layer, an upper buried silicon dioxide layer, a lower silicon device layer, a lower buried silicon dioxide layer and a handling silicon layer. At this time, the upper silicon device layer becomes the upper layer, the upper buried silicon dioxide layer becomes the intermediate layer, the lower silicon device layer becomes the lower layer, and the handling silicon layer becomes the substrate. Further, the lower buried silicon dioxide layer functions as an etch-stop layer. It is preferred that the thickness of the first upper silicon dioxide layer 204 is 0.1 $\mu$m~10 $\mu$m and the thickness of the polysilicon layer 205 is 0.1 $\mu$m~10 $\mu$m. The buried silicon dioxide layer 202 is an insulator, and the handling silicon layer 203 and the silicon device layer 201 are conductors.

Figure 4B:
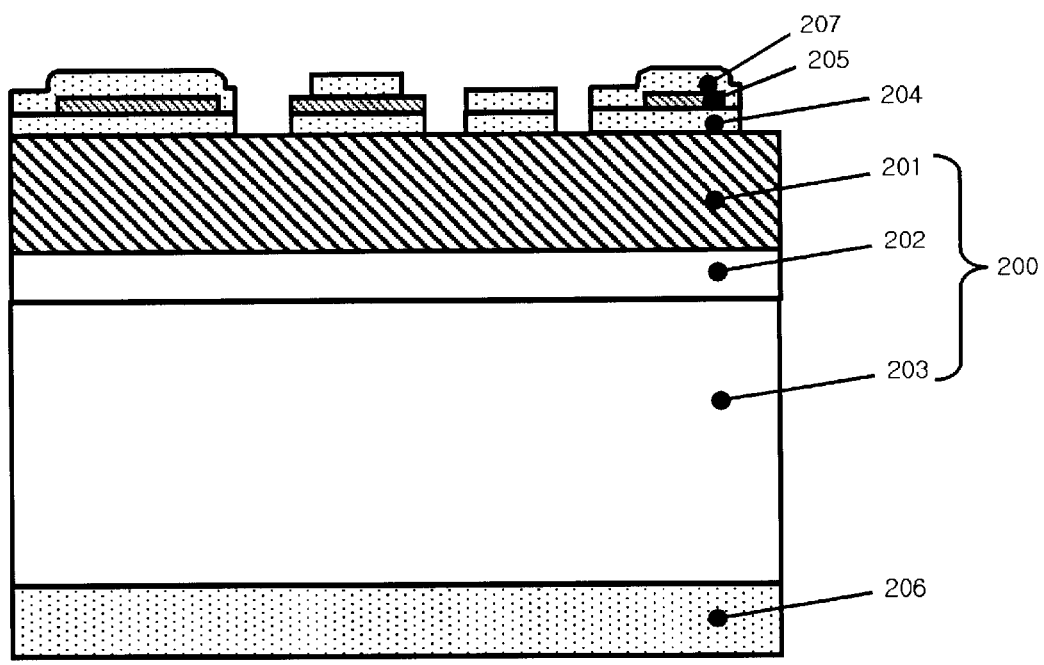

FIG. 4b is the cross-sectional view of the scanning micromirror illustrating a state that a second upper silicon dioxide layer 207 is deposited on the entire structure, and the second upper silicon dioxide layer 207 and the first upper silicon dioxide layer 204 are then patterned. At this time, the optical reflecting means 110, the second comb-type electrostatic actuators 116, the first comb-type electrostatic actuators 118, the inner frame 112, the outer frame 114, the second torsion springs 120 and the first torsion springs 122 are all patterned. At a portion consisting of the first upper silicon dioxide layer 204 and the second upper silicon dioxide layer 207, only the lower layer remains after the final process. This corresponds to the optical reflecting means 110, a portion of the inner frame 112 to which the first movable combs are connected, the second torsion springs 120, the second movable combs 116b and the first movable combs 118b. At this time, it is preferred that the thickness of the second upper silicon dioxide layer 207 is 0.1 $\mu$m~10 $\mu$m. All of the upper layer, the intermediate layer and the lower layer remain after the final process at a portion where polysilicon 205 remains between the first upper silicon dioxide layer 204 and the second upper silicon dioxide layer. This corresponds to the fixed combs 116a and 118a in the second comb-type electrostatic actuators and the first comb-type electrostatic actuators, the first torsion springs 122, the outer frame 114, and a portion of the inner frame 112 to which the second fixed combs are connected. As the fixed combs and the 5 movable combs are patterned together when the first upper silicon dioxide layer 204 and the second upper silicon dioxide layer 207 are etched, the method of manufacturing the present invention is characterized by self-alignment between the fixed combs and the movable combs.

Figure 4C:
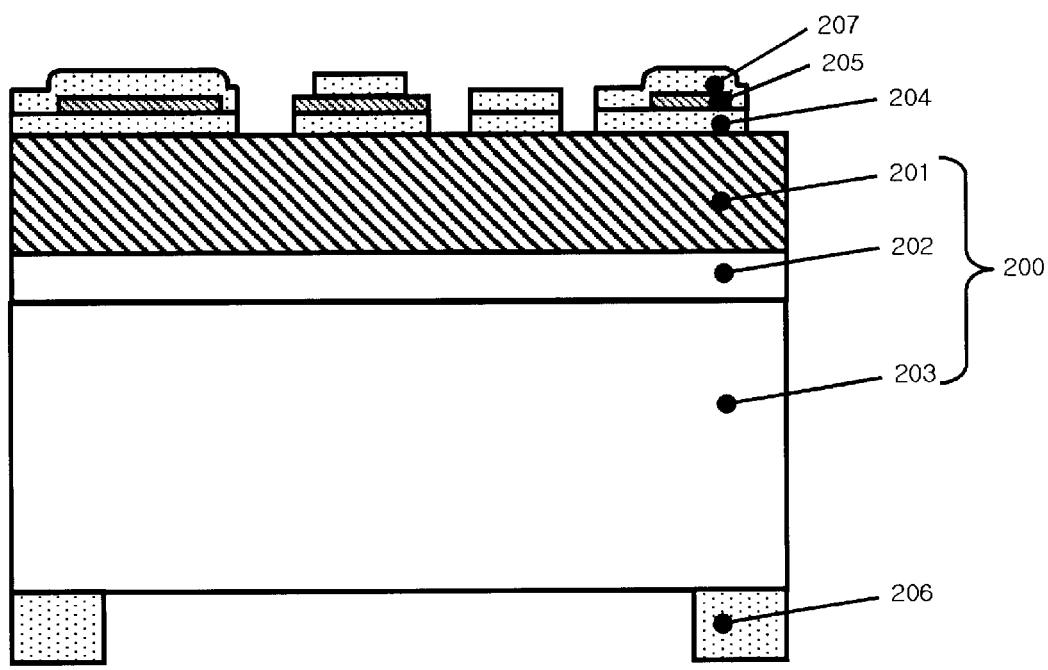

Thereafter, referring now to FIG. 4c, the lower silicon dioxide layer 206 is patterned using a mask that defines a portion in which the handling layer is thinned down to have a given thickness. This is for preparing etching the handling silicon layer 203 in FIG. 4f that will be described later.

Figure 4D:
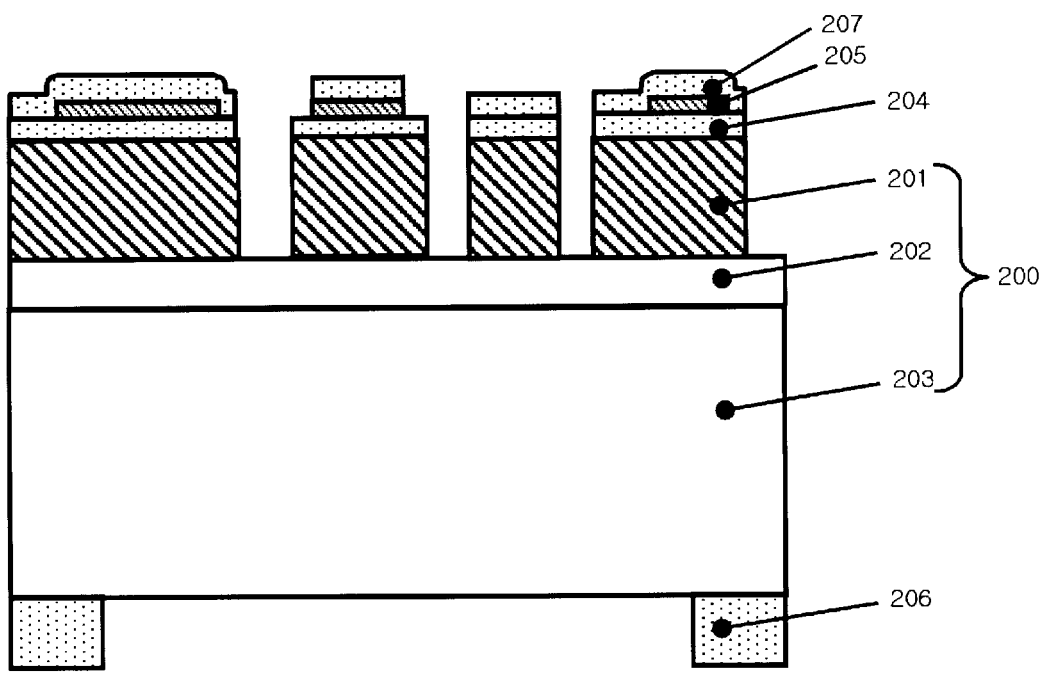

By reference to FIG. 4d, the silicon device layer 201 is etched using the patterned first upper silicon dioxide layer 204. As the silicon device layer is separated by etching, electrical isolation is made between respective portions of the upper layer of the scanning micromirror.

Figure 4E:
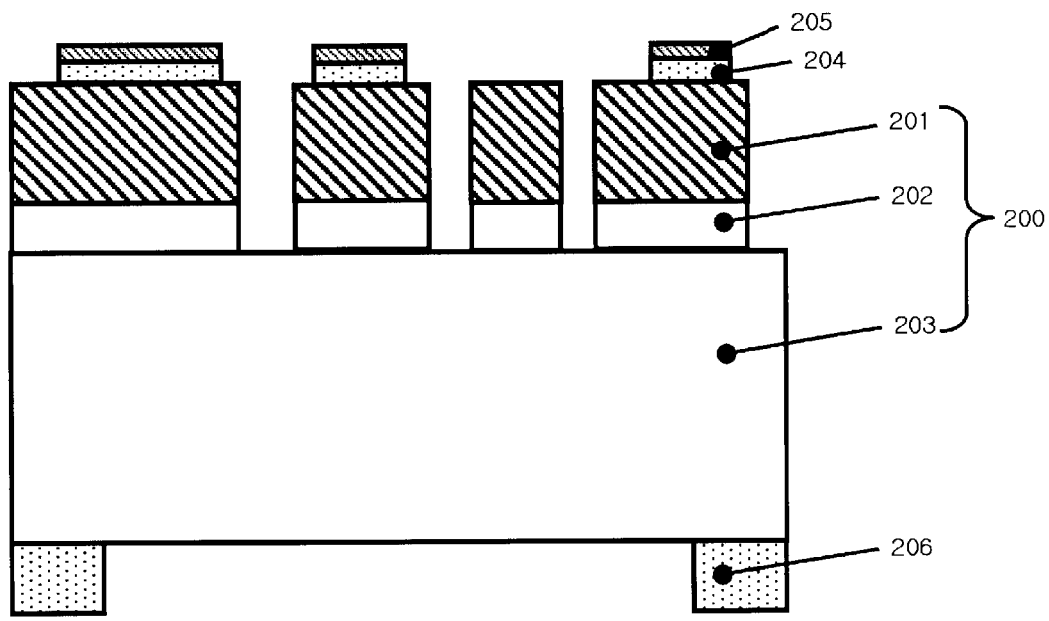

Referring now to FIG. 4e, the second upper silicon dioxide layer 207 is removed. The first upper silicon dioxide layer 204 is then removed using the remaining polysilicon layer as a mask and the buried silicon dioxide layer 202 is also etched using the remaining silicon device layer 201 as a mask. The reason for etching the buried silicon dioxide layer in this step is that the portion from which the silicon device layer 201 is etched is etched up to the handling silicon layer 203 in FIG. 4g. The entire second upper silicon dioxide layer 207 is removed, and only exposed portions of the remaining first upper silicon dioxide layer 204 and the buried silicon dioxide layer 202 are etched. The etch process is preformed using an equipment having a selective etching property between the silicon dioxide layer and silicon.

Figure 4F:
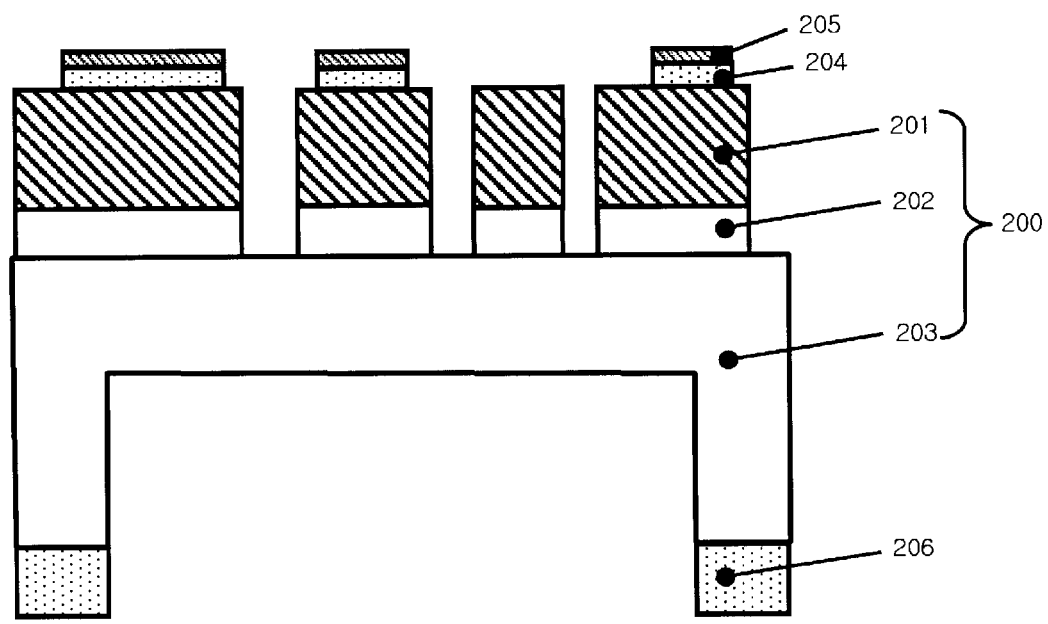

Next, referring now to FIG. 4f, the handling silicon layer 203 is etched using the lower silicon dioxide layer 206 as a mask, thus having a given thickness. At this time, the thickness of the remaining handling silicon layer 203 decides the thickness of the lower layer 102 of the scanning micromirror. At this time, it is preferred that the thickness of the handling silicon layer is 1 $\mu$m~500 $\mu$m.

Figure 4G:
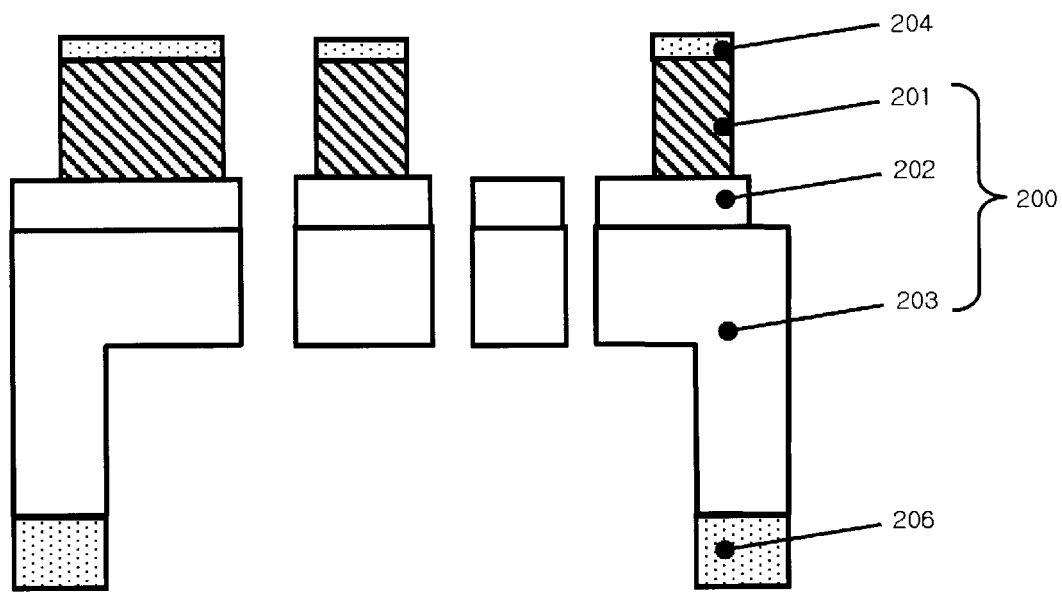

Thereafter, referring now to FIG. 4g, the polysilicon layer 205 is removed and the silicon device layer 201 is etched using the first upper silicon dioxide layer 204 remained below the polysilicon layer 205 as a mask. Also, the handling silicon layer 203 is etched using the buried silicon dioxide layer 202 as a mask. The etch process is performed using an equipment in which the etch rate of silicon dioxide is much slower (about 1/100) than that of silicon. In this step, the scanning micromirror is released from the substrate.

Figure 4H:
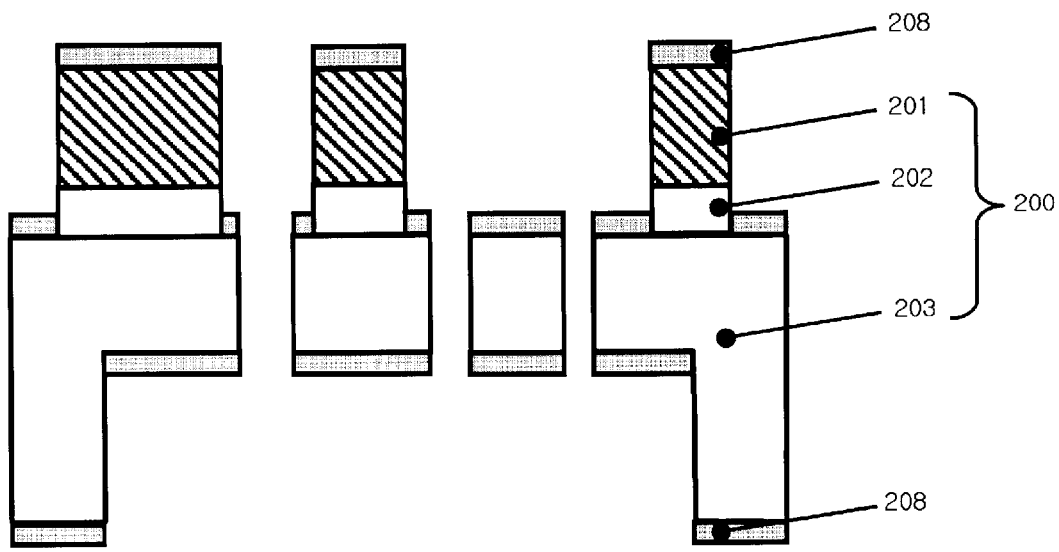

Referring now to FIGS. 4h, the first upper silicon dioxide layer 204, the lower silicon dioxide layer 206 and the buried silicon dioxide layer 202 are removed. A metal layer 208 is deposited on upper surface and lower surface of the entire structure. At this time, since the upper layer and the lower layer must be physically connected, only a part of the buried silicon dioxide layer 202 being the intermediate layer, which is located between the silicon device layer 201 being the upper layer and the handling silicon layer 203 being the lower layer, is removed. At this time, the deposited metal layer 208 serves to improve the reflectivity of the optical reflecting means while serving as an electrical interconnection. The metal layer 203 is made of any one of gold (Au), aluminum (Al), copper (Cu), platinum (Pt), chrome (Cr), titanium (Ti), titanium-tungsten (TiW), and nickel (Ni), or a combination of a part of them. At this time, it is preferred that the total thickness of the metal layer 208 is 10 nm~5 $\mu$m.

Figure 5:
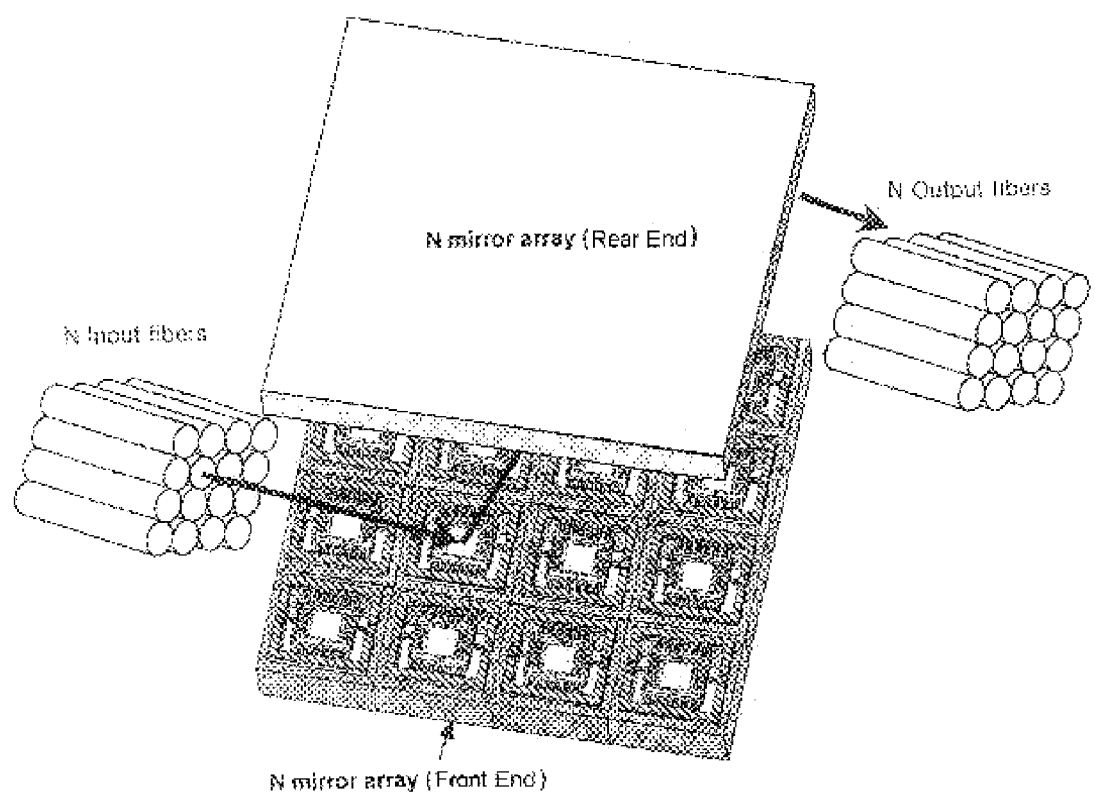
FIG. 5 is a perspective view of a scanning micromirror array in which the scanning micromirror according to one embodiment of the present invention is applied to 3-dimensional optical cross-connect.

Referring now to FIG. 5, an example in which the scanning micromirror according to one embodiment of the present invention is applied to various devices for optical communication will be now described.

FIG. 5 is a perspective view of a scanning micromirror array in which the scanning micromirror according to the embodiment of the present invention is applied to the 3-D optical cross-connect (OXC).

In the 3-D optical cross-connect (OXC), any scanning micromirror at the front stage corresponds to a single input port. Any scanning micromirror at the rear stage corresponds to a single output port. The 3-D OXC in which the input/output port is N×N, can be implemented using 2N scanning micromirrors. For example, if an optical signal is to be transmitted from an $i^{th}$ input optical fiber to a $j^{th}$ input optical fiber, a spatial light path needs to be established from the $i^{th}$ input optical fiber through the $i^{th}$ micromirror at the front stage and the $j^{th}$ micromirror at the rear stage to the $j^{th}$ output optical fiber by rotating the $i^{th}$ scanning micromirror at the front stage and the $j^{th}$ scanning micromirror at the rear stage in 2-axes.

The scanning micromirror according to the one embodiment of the present invention can be used in a wavelength selective cross-connect (WSXC), an optical add-drop multiplexer (OADM), a display, an optical scanner, or the like. WSXC is generally similar to OXC. WSXC is different from OXC by the fact that optical signals are demultiplexed by wavelength demultiplexers which are placed between input optical fibers and the scanning micromirror array and each wavelength is redirected to different outputs by the scanning micromirrors and then multiplexed by multiplexers which are placed between the scanning micromirror array and output optical fibers to be sent to the output optical fibers. At this time, in the scanning micromirror array that is arranged in one dimension or two dimensions, one scanning micromirror is used to route corresponding one wavelength.

An example in which the scanning micromirror of the present invention is used in the optical add-drop multiplexer (OADM) will be now described. OADM is, for example, used to upload a signal from a subscriber to a main stream or to download the signal from the main stream. OADM serves to transmit the signal of the main stream from the input to the output if the signal is to be flowed intact at a node where the main stream and the subscriber meet in the optical network. OADM also serves to transmit the input signal to corresponding one drop port and corresponding one add signal to the output port, when the signal from the subscriber is uploaded to the main stream and the signal of the main stream is downloaded to the subscriber. At this time, each of the scanning micromirrors that are arranged in one dimension or two dimensions serves to build a light path of the optical signal between input/output and add/drop port among a plurality of the subscribers.

Next, an example in which the scanning micromirror of the present invention is used in the display device will be now described. Each of the scanning micromirrors that are arranged in two dimensions serves as a single pixel and thus reflects light to the screen. At this time, the contrast of each pixel can be controlled by adjusting the angle of the scanning micromirror.

Finally, an example in which the scanning micromirror of the present invention is used in the scanning device will be now described. Each of the scanning micromirrors that are arranged in one dimension or two dimensions scans light in 3-D space, so that a scanning device that is applied to a laser printer, a laser scanner, a barcode scanner, or the like is constructed.

Relationship between a voltage applied to the scanning micromirror according to one embodiment of the present invention and a rotation angle of the optical reflecting means and the inner frame will be now described in detail.

In the scanning micromirror, if a finger of the fixed comb 116a or 118a and a finger of the movable comb 116b or 118b that are located at one side of the inner frame 112 or the outer frame 114 is defined as a unit cell, the capacitance $C_{unit}$ of this unit cell can be approximated as the following Mathematic Equation 1:

$$C_{unit}(\theta) = \frac{\varepsilon_0}{2G_f}(L_2^2 - L_1^2)\theta \qquad \text{[Equation 1]}$$

At this time, $\theta$ is the rotation angle of the optical reflecting means 110 or the inner frame 112, $\varepsilon_0$ is a permittivity of air, $L_2$ is the distance from the torsion spring 120 or 122 up to the free end of the finger of the movable comb 116b or 118b, $L_1$ is the distance from the torsion spring 120 or 122 up to the free end of the finger of the fixed comb 116a or 118a, and $G_f$ is the lateral distance between the finger of the fixed comb 116a or 118a and the finger of the movable comb 116b or 118b.

Further, the electrostatic torque, Te, which occurs when a voltage V is applied between the fixed comb 116a or 118a and the movable comb 116b or 118b, can be expressed as the following Equation 2:

$$T_e = \frac{1}{2}\frac{\partial C}{\partial \theta}V^2 = N_f \frac{\partial C_{unit}}{\partial \theta}V^2 = \frac{\varepsilon_0 N_f}{2G_f}(L_2^2 - L_1^2)V^2 \qquad \text{[Equation 2]}$$

At this time, $N_f$ is the number of the fingers in the fixed comb 116b or 118b or the movable comb 116b or 118b. A restoring torque $T_m$ of the torsion spring 120 or 122 serves to equilibrate the electrostatic torque $T_e$ and can be expressed as the following Equation 3:

$$T_m = \frac{2GW_s^3 T_s}{3L_s}\left(1 - \frac{192}{\pi^5}\frac{W_s}{T_s}\tanh(\frac{\pi T_s}{2W_s})\right)\theta = k_s\theta \qquad \text{[Equation 3]}$$

At this time, $W_S$, $T_S$ and $L_S$ are the width, thickness and length of the torsion spring 120 or 122, respectively. G indicates a shear modulus and $k_S$ indicates a torsion spring constant. Coefficient 2 implies that a number of the torsion springs is two and should be changed according to the number of the corresponding torsion springs. Further, Equation 3 is established assuming that the width $W_S$ of the torsion spring 120 or 122 is smaller than the thickness $T_S$. Since the electrostatic torque $T_e$ in Equation 2 and the restoring torque $T_m$ in Equation 3 are same at an equilibrium, the rotation angle $\theta$ of the optical reflecting means 110 and the inner frame 112 according to the voltage V applied to the scanning micromirror can be expressed as the following Equation 4:

$$\theta = \frac{\varepsilon_0 N_f}{2k_s G_f}(L_2^2 - L_1^2)V^2 \qquad \text{[Equation 4]}$$

Figure 6:
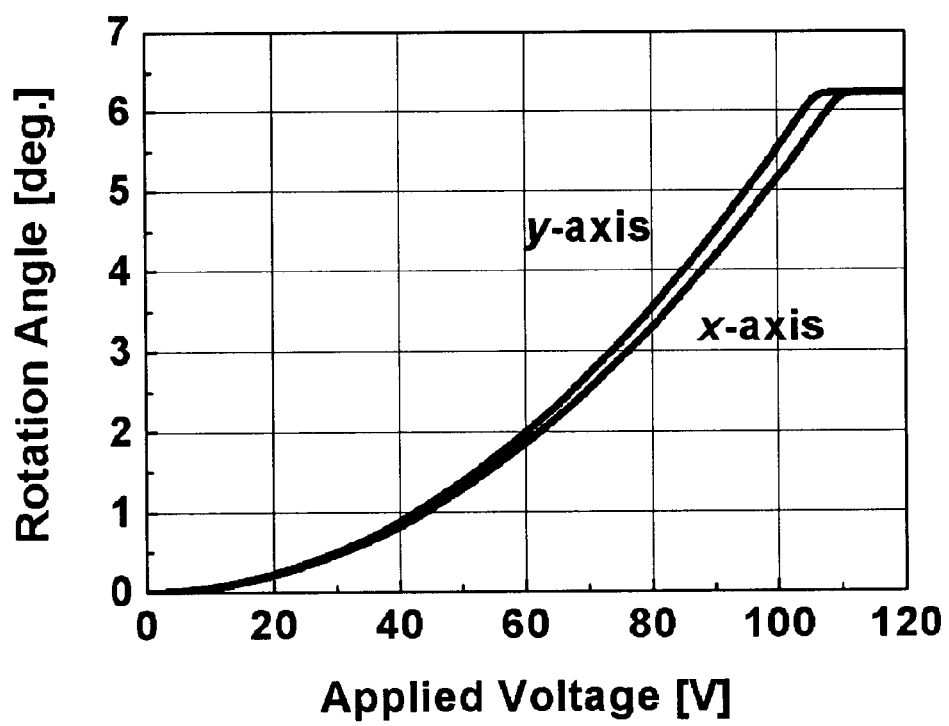
FIG. 6 is a graph representing a relationship between a voltage applied to the scanning micromirror and a rotation angle of the optical reflecting means and the inner frame according to the preferred embodiment of the present invention.

FIG. 6 is a graph showing a relationship between a voltage applied to the scanning micromirror and a rotation angle of the optical reflecting means 110 and the inner frame 112 according to the preferred embodiment of the present invention.

Based on the Equation 4, the graph in FIG. 6 shows a characteristic result of the rotation angle $\theta$ versus the voltage V for each of the x and y axes, in case that the first torsion springs 122 are made of silicon (G=76 Gpa) having a width $W_S$ of 5 µm, thickness $T_S$ of 150 µm and length $L_S$ of 450 µm, the second torsion springs 120 are made of silicon having a width $W_S$ of 5 µm thickness $T_S$ of 75 µm and length $L_S$ of 300 µm, $N_f$, $L_2$ and $L_1$ of the first comb-type electrostatic actuators 118 are 146, 720 µm and 620 µm, respectively, and $N_f$, $L_2$ and $L_1$ of the second comb-type electrostatic actuators 116 are 62, 720 µm and 550 µm, respectively.

As mentioned above, the scanning micromirror for optical communications according to the present invention employs vertical comb-type electrostatic actuators. With this construction, an available rotation angle is made large compared to a conventional case using a parallel-plate type electrostatic actuator. And the present invention has an advantage that it can obtain a large rotation angle in non-resonant mode as well as resonant mode, because the vertical asymmetry of the fixed comb and the movable comb is large. Further, the torsion spring constant can be increased while the same driving voltage is maintained so that the switching time can be reduced or the driving voltage can be lowered by the increase of the electric field density while the same torsion spring constant is maintained. In addition, the present invention has an advantage that it can reduce instability during actuation since the fixed comb and the movable comb are self-aligned.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A scanning micromirror for optical communications, comprising:

an outer frame having an aperture therein;

an inner frame located within the aperture of the outer frame and having an aperture therein;

an optical reflecting means located within the aperture of the inner frame;

a plurality of first torsion springs connected between an inner wall of the outer frame and an outer wall of the inner frame, for supporting the inner frame;

a plurality of second torsion springs connected between the inner wall of the inner frame and the optical reflecting means, for supporting the optical reflecting means;

a pair of first comb-type electrostatic actuators electrically isolated from each other for applying electrostatic torques by which the inner frame is rotated bi-directionally about an axis of the first torsion springs; and a pair of second comb-type electrostatic actuators electrically isolated from each other for applying electrostatic torques by which the optical reflecting means is rotated bi-directionally about an axis of the second torsion springs.

2. The scanning micromirror for optical communications as claimed in claim 1, wherein the plane of the optical reflecting means is rectangular, hexagonal, octagonal, circular or oval.

3. The scanning micromirror for optical communications as claimed in claim 1, wherein the plurality of first torsion springs and the plurality of second torsion springs have a straight line type, a longitudinal meander type, a transversal meander type, or a mixed type of the longitudinal meander type and the transversal meander type.

4. The scanning micromirror for optical communications as claimed in claim 1, wherein the plurality of the first torsion springs and the plurality of the second torsion springs are positioned perpendicularly to each other.

5. The scanning micromirror for optical communications as claimed in claim 1, wherein the pair of first comb-type electrostatic actuators include first fixed combs of which one ends are connected to the inner wall of the outer frame and the other ends are free, and first movable combs of which one ends are connected to the outer wall of the inner frame and other ends are free, wherein the first movable combs are interdigitated with the first fixed combs.

6. The scanning micromirror for optical communications as claimed in claim 1, wherein the pair of second comb-type electrostatic actuators include second fixed combs of which one ends are connected to the inner wall of the inner frame and the other ends are free, and second movable combs of which one ends are connected to the optical reflecting means and the other ends are free, wherein the second movable combs are interdigitated with the second fixed combs.

7. A method of manufacturing a scanning micromirror for optical communications, comprising the steps of:

(a) forming a first upper silicon dioxide layer and a lower silicon dioxide layer on both sides of a silicon-on-insulator (SOI) wafer comprising a handling silicon layer, a buried silicon dioxide layer and a silicon device layer;

(b) depositing a polysilicon layer on the first upper silicon dioxide layer and then patterning the polysilicon layer using a mask that defines first fixed combs, second fixed combs, first torsion springs, an outer frame and a portion of an inner frame to which the second fixed combs are connected;

(c) depositing a second upper silicon dioxide layer on the entire structure and then patterning the second upper silicon dioxide layer and the first upper silicon dioxide layer using a mask that defines the remaining polysilicon layer, first movable combs, second movable combs, an optical reflecting means, second torsion springs and a portion of the inner frame to which the first movable combs are connected;

(d) patterning the lower silicon dioxide layer using a mask that defines a portion in which the handling layer is thinned down to have a given thickness;

(e) etching the silicon device layer using the first upper silicon dioxide layer as a mask;

(f) removing the second upper silicon dioxide layer, etching the first upper silicon dioxide layer using the remaining polysilicon layer as a mask and then etching the buried silicon dioxide layer using the silicon device layer as a mask;

(g) etching the handling silicon layer using the lower silicon dioxide layer as a mask, so that the handling silicon layer has a given thickness;

(h) removing the polysilicon layer, etching the silicon device layer using the first upper silicon dioxide layer remaining below the polysilicon layer as a mask and then etching the handling silicon layer using the buried silicon dioxide layer as a mask; and (i) removing the first upper silicon dioxide layer and the lower silicon dioxide layer, removing the buried silicon dioxide layer using the remaining silicon device layer as a mask and then depositing a metal layer on upper surface and lower surface of the entire structure.

8. The method as claimed in claim 7, wherein in the step (a), the thickness of the handling silicon layer is 100 μm~1000 μm, the thickness of the buried silicon dioxide layer is 0.5 μm~10 μm and the thickness of the silicon device layer is 1 μm~500 μm.

9. The method as claimed in claim 7, wherein the thickness of the first upper silicon dioxide layer and the second upper silicon dioxide layer is 0.1 μm~10 μm and the thickness of the polysilicon layer is 0.1 μm~10 μm.

10. The method as claimed in claim 7, wherein in the step (g), a given thickness of the handling silicon layer is 1 μm~500 μm.

11. The method as claimed in claim 7, wherein in the step (i), the metal layer is made of any one of gold, aluminum, copper, platinum, chrome, titanium, titanium-tungsten, and nickel, or a combination of a part of the above metals, and the entire thickness of the metal layer is 10 μm~5 μm.

* * * * *